No. 731,652. Patented June 23, 1903.

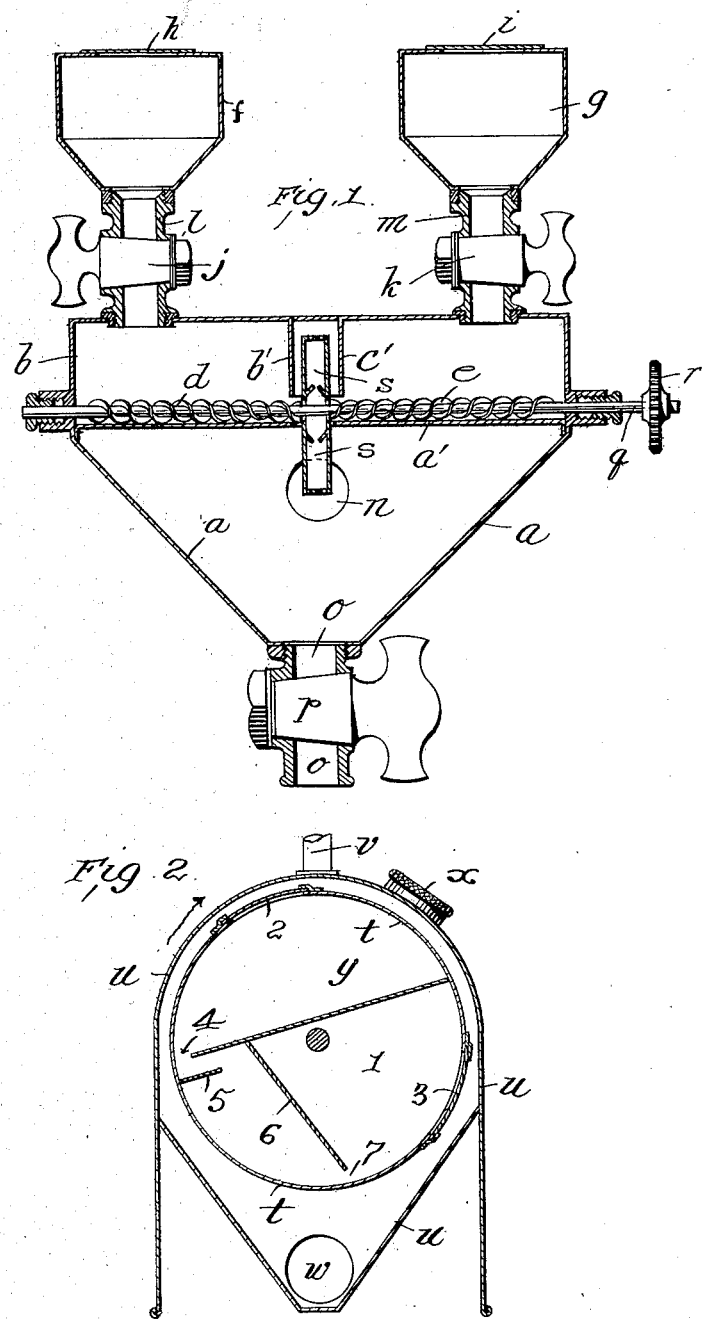

UNITED STATES PATENT OFFICE.

GEORGE JONES ATKINS, OF TOTTENHAM, ENGLAND.

PROCESS OF GENERATING ACETYLENE GAS.

SPECIFICATION forming part of Letters Patent No. 731,652, dated June 23, 1903.

Application filed June 5, 1900. Serial No. 19,121. (No specimens.)

*To all whom it may concern:*

Be it known that I, GEORGE JONES ATKINS, metallurgical chemist, a subject of the Queen of Great Britain, residing at the Laboratory, 5 Ruskin Road, Tottenham, in the county of Middlesex, England, have invented a certain new and useful Improvement in the Manufacture of Gases and other Products, (for which I have applied for patents in the following countries: Great Britain, dated November 9, 1899, No. 22,425; France, dated May 7, 1900; Belgium and Sweeden, May 8, 1900; Italy, Austria, and Spain, May 9, 1900; Norway, May 15, 1900; Switzerland, May 16, 1900; Denmark, May 19, 1900, and Hungary, May 21, 1900;) and I do hereby declare the following to be a full, clear, and exact description of the invention, such as will enable others skilled in the art to which it appertains to make and use the same.

This invention relates to the manufacture of gas or gaseous vapor for illuminating and other purposes and other chemical compounds or residual products of a more or less valuable character.

The accompanying drawings illustrate diagrammatically apparatus which may conveniently be employed for carrying out this invention; but I wish it to be clearly understood that I do not limit myself to the use of the apparatus illustrated, as more or less similar apparatus may be employed without departing from my invention.

In the drawings, Figures 1 and 2 are sectional views of two different forms of gas-generating apparatus.

For the purpose of my invention I take a suitable carbid—such as calcium carbid, ($CaC_2$,) for example—and bring it into contact with solid or comparatively dry salts or other compounds or substances containing hydrogen and oxygen either in chemical combination as water of crystalization—such as sodium carbonate ($Na_2CO_310H_2O$) or potash alum, ($Al_2(SO_4)_3K_2SO_424H_2O$,) for example— or as water of combination with other elements, not including, however, water in its ordinary liquid state uncombined with other substances—such as crushed potatoes, grape and other fruit waste, seaweed, &c.—all of which contain $H_2O$ as water of combination along with various salts and other substances.

For example, I take, say, nine molecules of calcium carbid and bring it into intimate contact, by mixing and agitation, with one molecule of sodium carbonate, when mutual decomposition takes place, acetylene gas is generated, which can be utilized for illuminating or other purposes, and there remains a residual product consisting of calcium carbonate and oxid and sodium oxid, as shown by the following formula:

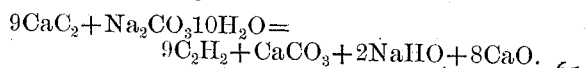
$$9CaC_2+Na_2CO_310H_2O= \\ 9C_2H_2+CaCO_3+2NaHO+8CaO.$$

If there is any phosphide of calcium present in the calcium carbid, phosphate of soda is formed; or, for example, I take, say, nine molecules of calcium carbid and bring it into intimate contact by mixing and agitation with one molecule of hydrated monosulfate of soda, when decomposition takes place, as shown in the following formula:

$$9CaC_2+NaSO_410H_2O= \\ 9C_2H_2+CaSO_4+2NaHO+8CaO;$$

that is to say, acetylene is produced, and there remains as residue calcium sulfate and sodium and calcium oxids, and I may then combine these alkaline residues or those produced from sodium carbonate above referred to with an oil or other grease and water to form soap.

When using mineral salts in combination with carbid in which caustic salt remains as a residue and I desire to utilize the latter for making soap, I in some cases combine with the salts before decomposition any suitable oleaginous or resinous matters and mix them thoroughly together, and such oleaginous or resinous matters may consist of the waste of oil-mills, such as that of linseed, cotton-seed, castor-oil seed, olive-oil waste, &c. All these contain oil and organic matter and the oil is thus recovered as an oleate. If resins be used, resinates are recovered. The addition of the oil or other grease as well as forming a valuable soap residue also plays a very important part in the production of the gas, as it modifies and acts as a restrainer to prevent the violent reaction and consequent rise of temperature; or, again, I take calcium carbid, for example, and bring it into intimate contact with crushed potatoes or other organic matter containing water of combination, ($H_2O$,) albumen, potassium salts, and starch-yielding substances. Acetylene gas is produced by the decomposition of the carbid by the water of combination and there remains a pulverulent residue consisting of calcium oxid, potassium oxid, and cellular matter containing starch and albumen, which can be removed by any known means.

I also produce acetylene gas by bringing carbid into intimate contact with any suitable organic matter, vegetable or animal, containing water in the form of water of combination, with the addition of mineral salts containing hydrogen and oxygen.

I also produce acetylene gas and lime and earth-metal products by mixing with calcium carbid, for example, an earth-metal salt, such as potash alum, ($Al(SO_4)3K_2SO_424H_2O$,) for example. Acetylene gas is produced and there remain as residues calcium sulfate and oxid, aluminium, and caustic potash.

I also produce acetylene gas and alkaline or acid salts by mixing with calcium carbid organic matter containing alkaline or acid compounds.

In treating vegetables or fruit or the waste of such substances, such as grape waste from wine-presses or waste from fruit-pulp, (all of which contain water of combination,) they may be combined with the carbid without adding salts, because they all contain, as well as organic matter, both acid and alkaline salts. In the case of the acid salts contained in the fruit—such as tartaric, citric, and oxalic—the lime residue left from the decomposition of the carbid by the water of combination forms tartrates, citrates, and oxalates of lime, which can be readily recovered by well-known means.

Seaweed taken in a solid moist state containing water of combination ($H_2O$) and potassium and sodium salts combined with chlorids, iodids, bromids, and proto-cellular tissue may be used for decomposing carbid for the production of gas and gives valuable residues—such as, for example, calcium, sodium, and potassium chlorids, iodids, and bromids, and cellular matter.

If the seaweed or other cellular matter is dried and ground with a salt—such as sodium carbonate, for example—before the same is mixed with the carbid, it prevents to a great extent the volatilization of the water of crystallization of such salt, which if allowed to take place greatly retards the decomposing power of the salt, and larger quantities of the latter have to be used than when volatilization of the water of crystallization is more or less prevented. Cellulose in the shape of sawdust, for example, may be used for the same purpose.

By combining the oleaginous, cellular, or other organic materials above named with salts that contain a large amount of water of crystallization before such salts are mixed with the carbid I am enabled to overcome a serious difficulty—namely, that such salts as the carbonate and sulfate of sodium, magnesium, and aluminium that contain large quantities of water of crystallization generate sufficient heat to liquefy them directly they are brought into contact with the carbid, and there occurs then a rush of aqueous vapor, and the resulting liquid and semiliquid salt is difficult to regulate and feed into the generator or mix with the carbid therein. By using oil, resin, or cellular matter, however, as above described, the generation of heat is largely prevented, the decomposition is retarded, and great advantages are gained both as regards the regulation and controlling of the generation of the gas, the quantity of gas generated, the commercial result arising from the production of a valuable by-product, and facility of feeding the salt and carbid into the generator.

The salt, when combined with the oil, resin, or other body, can be made into pellets of any shape and size, thus obviating the difficulty experienced in supplying the salt to the generator in the ordinary crystal form or in the ground form.

Aqueous vapor, if allowed to generate, acts at once upon the carbid, and if it contains any phosphides phosphoreted hydrogen is formed, which, as is well known, is very objectionable and dangerous when mixed with acetylene gas. An important feature of my invention is that by gradually combining the materials hereinbefore mentioned with the carbid the temperature does not become excessive, and the aqueous constituents are decomposed and not volatilized, so that the phosphorus remains in the residue and is not carried off in the acetylene gas, which is thus kept comparatively pure, less noisome than heretofore, and not liable to explosion when compressed.

Care should be taken that the material combined with the carbid contains sufficient basic salt to combine with the phosphorus.

In the above description I have referred more particularly to calcium carbid; but it is obvious that any other suitable carbid may be employed, the gases generated and residual products remaining varying according to the nature of the materials employed.

One advantage of my process of generating acetylene gas over the well-known water process is that as the generation of gas is gradual and explosive phosphorous compounds are not given off I am enabled to generate the gas in a strong cylinder and obtain any degree of pressure that the cylinder will bear, so that in using the gas for motor-car propulsion, for example, I not only get the force of explosion, but if compressed air be also used I get an intense force in a small cylinder, using the force of expansion of the gas and air as well as that of the explosion.

Referring now to Fig. 1 of the accompanying drawings, $a$ is a generating-chamber the upper part of which is divided into two compartments $b$ and $c$, formed of the horizontal partition $a'$ and the two vertical partitions $b'$ and $c'$ and through which compartments pass right-and-left traversing screws or conveyers $d$ and $e$. $f$ and $g$ are feeding-hoppers having inlet-openings furnished with air-tight covers $h$ and $i$, and regulating taps or valves $j$ and $k$ in the necks $l$ and $m$ connect the feeding-hoppers $f$ and $g$ with the compartments $b$ and $c$. $n$ is the gas-outlet, and $o$ is the outlet for the exhausted residual product. In order to charge the apparatus, the carbid and decomposing material in a granulated, powdered, or subdivided condition are placed in the feeding-hoppers $f$ and $g$, the regulating taps or valves $j$ and $k$ being closed. The air-tight covers $h$ and $i$ are then replaced and the tap $p$, governing the outlet $o$, is closed. When it is required to generate gas, the spindle $q$, carrying the traversing screws or conveyers $d\ e$, is caused to rotate by means of the spur-wheel $r$ or by other convenient means, and the regulating taps or valves $j\ k$ are so adjusted as to allow the requisite quantity of carbid and decomposing material in the proper proportion to fall into the compartments $b$ and $c$, respectively, where they are each caused to travel toward the center of the apparatus and to meet and mix in the perforated cage $s$, which rotates with the spindle $q$ and discharges its contents in a mixed condition through its perforated periphery into the bottom of the generating-chamber $a$, the openings in which are large enough to permit the discharge of the mixed contents. The cage S is attached to the blades of the screw, and therefore turns with the spindle $q$. Acetylene gas is thereby generated and passes by the gas-outlet $n$ to a reservoir or direct to the burner, as may be desired. The exhausted products may from time to time be withdrawn through the tap or valve $p$, or the compartments $b$ and $c$ may be filled with the respective materials and the taps or valves $j\ k$ closed. Then the covers $h$ and $i$ may be removed and the hoppers $f$ and $g$ recharged with fresh material during the process of generating gas from the materials in the compartments $b$ and $c$.

In Fig. 2, which illustrates another convenient form of gas-generating apparatus, $t$ is a drum which may be caused to rotate continuously or intermittently, as required, by any convenient and more or less automatic means within an air-tight casing $u$, which is furnished with a gas-outlet $v$ and a normally closed outlet $w$ for the exhausted residual products. The casing $u$ is also provided with a charging-opening which is normally closed by an air-tight cover $x$. The drum $t$ is divided by a suitable partition $y$ into practically two compartments, $z$ being the carbid compartment and 1 the mixing and generating compartment, the compartments being furnished with openings which are normally closed by slides 2 and 3, respectively. In order to charge the apparatus, the cover $x$ is removed, the drum $t$ is rotated until the opening in the compartment $z$ coincides with the opening in the casing, the slide 2 is pushed back, the charge of carbid introduced into the chamber $z$, and the slide 2 closed. The decomposing material is then introduced into the compartment 1 in a similar manner, the slide 3 is closed, and the air-tight cover $x$ replaced in position. When it is required to generate gas, the drum $t$ is caused to rotate by any suitable and more or less automatic means in the direction of the arrow until a small quantity of carbid falls by gravity through the opening 4, first onto the ledge 5, thence onto the plate 6, and through the opening 7 into the compartment 1, where it mixes with the decomposing material, and acetylene gas is thereby generated and passes through openings (not shown in the drawings) into the air-tight casing $u$ and by the gas-outlet $v$ to a reservoir or direct to the burners, as may be desired. The exhausted products may from time to time be removed by withdrawing the slide 3 in the manner hereinbefore described and rotating the drum until the opening at 3 is in the lowest position, when the products will fall into the bottom of the casing $u$, from whence they may be withdrawn through the outlet $w$.

Having now particularly described and ascertained the nature of my said invention and in what manner the same is to be performed, I declare that what I claim is—

1. The herein-described process of generating acetylene gas and producing by-products which consists in mixing carbid of calcium with one or more comparatively dry solid substances containing hydrogen and oxygen in the form of water, substantially as described.

2. The herein-described process of generating acetylene gas and producing by-products which consists in mixing carbid of calcium with an alkaline salt containing hydrogen and oxygen in the form of water, substantially as described.

3. The herein-described process of generating acetylene gas and producing by-products which consists in mixing calcium carbid with an alkaline salt and an oleaginous material, substantially as described.

4. The herein-described process of generating acetylene gas and producing by-products which consists in separately comminuting calcium carbid and a comparatively dry solid substance containing hydrogen and oxygen in the form of water, introducing said separate substances into a closed receptacle, and then gradually commingling them, substantially as described.

In witness whereof I have hereunto set my hand in presence of two witnesses.

GEORGE JONES ATKINS.

Witnesses:
WILLIAM HENRY BECK,
STEPHEN EDWARD GUNSON.